(12) United States Patent
Loch et al.

(10) Patent No.: US 12,597,669 B2
(45) Date of Patent: Apr. 7, 2026

(54) BATTERY MODULE AND METHOD FOR BRACING A BATTERY MODULE

(71) Applicant: Bayerische Motoren Werke Aktiengesellschaft, Munich (DE)

(72) Inventors: Robert Loch, Munich (DE); Christoph Warkotsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 276 days.

(21) Appl. No.: 18/280,286

(22) PCT Filed: Mar. 1, 2022

(86) PCT No.: PCT/EP2022/055047
§ 371 (c)(1),
(2) Date: Sep. 5, 2023

(87) PCT Pub. No.: WO2022/207210
PCT Pub. Date: Oct. 6, 2022

(65) Prior Publication Data
US 2024/0072359 A1 Feb. 29, 2024

(30) Foreign Application Priority Data

Mar. 30, 2021 (DE) ..................... 10 2021 107 991.8

(51) Int. Cl.
*H01M 50/249* (2021.01)
*H01M 10/052* (2010.01)
*H01M 50/244* (2021.01)
*H01M 50/264* (2021.01)
(52) U.S. Cl.
CPC ....... *H01M 50/249* (2021.01); *H01M 10/052* (2013.01); *H01M 50/244* (2021.01); *H01M 50/264* (2021.01); *H01M 2220/20* (2013.01)

(58) Field of Classification Search
CPC ............. H01M 50/249; H01M 50/264; H01M 50/244; H01M 10/052; H01M 2220/20
See application file for complete search history.

(56) References Cited

U.S. PATENT DOCUMENTS

2003/0017387 A1 1/2003 Marukawa et al.
2011/0177377 A1 7/2011 Dube
(Continued)

FOREIGN PATENT DOCUMENTS

CN 112331998 A 2/2021
DE 10 2008 059 966 A1 6/2010
(Continued)

OTHER PUBLICATIONS

International Search Report (PCT/ISA/210) issued in PCT Application No. PCT/EP2022/055047 dated Jun. 20, 2022 with English translation (4 pages).
(Continued)

*Primary Examiner* — Huan Le
(74) *Attorney, Agent, or Firm* — Crowell & Moring LLP

(57) ABSTRACT

A battery module stores electrical energy. The battery module includes one or more battery cells disposed between two compression plates so as to be next to one another along a transverse axis of the battery module. The battery module is configured such that a spacing between the two compression plates is variable within a spacing range so that a variation in a spatial extent of the one or more battery cells exists along the transverse axis. The two compression plates apply a compressive force to the one or more battery cells within the entire spacing range.

16 Claims, 6 Drawing Sheets

(56) References Cited

U.S. PATENT DOCUMENTS

| | | |
|---|---|---|
| 2011/0262797 A1 | 10/2011 | Kim |
| 2021/0320360 A1 | 10/2021 | Chen et al. |

FOREIGN PATENT DOCUMENTS

| | | | | |
|---|---|---|---|---|
| DE | 10 2008 059 966 B4 | 6/2011 | | |
| DE | 10 2010 012 935 A1 | 9/2011 | | |
| DE | 10 2014 219 609 A | 3/2016 | | |
| EP | 2381506 B1 * | 12/2012 | ........ | H01M 10/4207 |
| JP | 2003-36830 A | 2/2003 | | |
| KR | 10-2011-0117586 A | 10/2011 | | |
| KR | 10-2019-0112467 A | 10/2019 | | |
| WO | WO 2017/087807 A1 | 5/2017 | | |

OTHER PUBLICATIONS

German-language Written Opinion (PCT/ISA/237) issued in PCT Application No. PCT/EP2022/055047 dated Jun. 20, 2022 with English translation (9 pages).

German-language Search Report issued in German Application No. 10 2021 107 991.8 dated Nov. 25, 2021 with partial English translation (12 pages).

Korean-language Office Action issued in Korean Application No. 10-2023-7027825 dated Jul. 2, 2025 with English translation (13 pages).

Japanese-language Office Action issued in Japanese Application No. 2023-557800 dated Jan. 7, 2026 with English translation (8 pages).

\* cited by examiner

500 ~

501

502

BATTERY MODULE AND METHOD FOR BRACING A BATTERY MODULE

BACKGROUND AND SUMMARY OF THE INVENTION

The present subject matter relates to a battery module and to a method for bracing a battery module, in particular a solid state battery such as, for example, a lithium-ion battery with a solid state electrolyte.

A vehicle which is at least partially electrically driven has a battery, or a battery module, for storing electric energy for the operation of an electric drive motor of the vehicle. The battery module typically has a multiplicity of individual battery cells, in particular a multiplicity of pouch cells, which are disposed next to one another in a housing of the battery module. During the operation of the vehicle the battery module is repeatedly charged and discharged, whereby the individual battery cells can have different spatial extents in the discharged state and in the charged state, respectively. In order for the battery module to operate reliably, specific, in particular consistent, conditions in terms of the bracing of the individual battery cells should be maintained even in different operating states of the battery module.

The present document is focused on the technical object of enabling in each case a precise adjustment of bracing conditions of the individual battery cells of a battery module in different operating states of the battery module, in particular in order to provide a battery module with a high performance.

This object is achieved by each of the independent claims. Advantageous examples are described inter alia in the dependent claims. It is to be noted that additional features of a patent claim dependent on an independent patent claim, without the features of the independent patent claim or in combination with only a subset of the features of the independent patent claim, can form a separate invention independent of the combination of all features of the independent patent claim, which can be made the subject matter of an independent patent claim, a divisional application, or a subsequent application. This applies in the same manner to technical teachings described in the description, which can form an invention independent of the features of the independent patent claims.

Described according to one aspect is a battery module for storing electric energy. The battery module can have a nominal voltage of 60 V or more, or of 300 V or more, in particular of 800 V or more. The battery module can be configured to store electric energy for the operation of a drive motor of a motor vehicle. A motor vehicle can potentially comprise a plurality of battery modules which conjointly form one battery for the motor vehicle. The individual battery modules can at least in part be wired in series and/or at least in part be wired in parallel. For example, a plurality of battery modules can be wired in series so as to provide a vehicle battery with an increased overall nominal voltage.

The battery module comprises one or a plurality of battery cells (in particular 10 or more, or 50 or more, battery cells) which are disposed between two compression plates so as to be next to one another along the transverse axis of the battery module. A battery cell may be a pouch cell, wherein the transverse axis is perpendicular to the face and/or to the layers of the pouch cell. The transverse axis of the battery module can coincide with the transverse axis of the vehicle in which the battery module is disposed.

The battery module is configured in such a manner that the spacing between the two compression plates is variable within a specific spacing range, so that a variation in the spatial extent (in particular an expansion and/or a contraction) of the one or the plurality of battery cells along the transverse axis is made possible. In particular, the battery module can be configured in such a manner that, as a result of the variation (increase or decrease in size) of the spatial extent of the one or the plurality of battery cells along the transverse axis, a corresponding variation (increase or decrease in size) of the spacing between the two compression plates is caused.

The battery module can be configured in such a manner that a first compression plate of the two compression plates is movably mounted (on a support of the vehicle), and a second compression plate of the two compression plates is immovably mounted (on another support of the vehicle). In this way, a variation in the spacing between the two compression plates can be reliably enabled.

The one or the plurality of battery cells in a discharged state can have a minimum overall extent along the transverse axis. Furthermore, the one or the plurality of battery cells in a charged state can have a maximum overall extent along the transverse axis. In this way, the one or the plurality of battery cells can be configured in such a manner that the one or the plurality of battery cells expand (along the transverse axis) during a charging procedure and/or contract (along the transverse axis) during a discharging procedure. The expansion can be in the range of 10% of the overall extent, for example. The maximum overall extent of the one or the plurality of battery cells can be between 5% and 15% above the minimum overall extent of the one or the plurality of battery cells, for example. An expansion of this type may be present in particular in an electrochemical battery cell with a solid state electrolyte (a so-called all solid state battery, ASSB), in particular in a lithium-ion cell with a solid state electrolyte.

The spacing range in which the spacing between the two compression plates varies can be delimited toward the bottom by the minimum overall extent, and toward the top be delimited by the maximum overall extent.

The battery module can furthermore be configured in such a manner that a compressive force acting on the one or the plurality of battery cells within the entire spacing range is caused by the two compression plates. The battery module can in particular be configured in such a manner that a compressive force acting on the one or the plurality of battery cells which within the entire spacing range varies by at most 20%, in particular by at most 10%, is caused by the two compression plates. Alternatively, or additionally, the battery module can be configured in such a manner that a compressive force acting on the one or the plurality of battery cells is caused by the two compression plates so that within the entire spacing range a minimum pressure on the one or the plurality of battery cells is not undershot and/or a maximum pressure on the one or the plurality of battery cells is not exceeded. For example, the minimum pressure can be 8 bar or more, and/or the maximum pressure can be 12 bar or less.

This thus describes a battery module which is configured to expand and/or contract along the transverse axis so as to make possible a corresponding expansion and/or contraction of the one or the plurality of battery cells of the battery module, and so as to cause at all times a specific (potentially substantially consistent) pressure on the one or the plurality of battery cells in the process. In this way, a high performance of the battery module can be enabled in a reliable manner.

The battery module, between two battery cells that are disposed so as to be directly next to one another, can have in each case a frame which is mounted so as to be movable along the transverse axis. The battery cells during expansion and/or during contraction can be guided by the individual frames in order to enable an ideally smooth operation of the battery module.

The battery module can comprise at least one compression element which is configured to push and/or pull the first (movably mounted) compression plate of the two compression plates toward the second (immovably mounted) compression plate of the two compression plates such that the compressive force acting on the one or the plurality of battery cells is caused by the two compression plates. The compression element here can comprise at least one elastic element (e.g. a spring). In this way, a compressive force acting on the one or the plurality of battery cells can be caused in a particularly efficient and reliable manner.

The compression element can comprise at least one planar-shaped or strap-shaped tensioning element, in particular a rubber tensioning strap and/or a serpentine spring, which is configured to pull the first compression plate toward the second compression plate. The planar-shaped or strap-shaped tensioning element can form, for example, an elastic anchor which connects the two compression plates to one another and converges them. In this way, the compressive force acting on the one or the plurality of battery cells can be caused in a particularly efficient and reliable manner.

Alternatively or additionally, the compression element can comprise at least one spring, in particular a leaf spring, a compression spring, a leg spring and/or a disk spring, which is configured to push the first compression plate toward the second compression plate. The spring here can be disposed between a support for the battery module and the first compression plate. In this way, the compressive force acting on the one or the plurality of battery cells can be caused in a particularly efficient and reliable manner.

The compression element can be configured in such a manner that the force which is caused to act from the spring on the first compression plate is varied as a function of the spacing between the two compression plates, in particular as a result of a disposal of the spring which is oblique in relation to the transverse axis and/or as a result of the use of a lever. For example, the compression element can have a leg spring with one leg which acts on a cam that is connected to the first compression plate. Alternatively, or additionally, the compression element can comprise a compression spring which acts on the first compression plate by way of a toggle lever. In this way, the profile of the force which, depending on the expansion of the one or the plurality of battery cells, is caused to act from the compression element by way of the first compression plate on the one or the plurality of battery cells can be adjusted in a particularly precise manner, so as to further increase the performance of the battery module.

Described according to a further aspect is a (road) motor vehicle (in particular a passenger automobile or a motor truck or a bus or a motorcycle) which comprises at least one of the battery modules described in this document. The vehicle can in particular comprise a plurality of battery modules which may in part be disposed in series and/or in parallel, for example. Furthermore, the vehicle can comprise at least one support to which the one or the plurality of battery modules are fastened.

The vehicle can comprise a first battery module and a second battery module. The first battery module and the second battery module can be disposed in the vehicle in such a manner that the spacing between the movably mounted compression plate of the first battery module and the movably mounted compression plate of the second battery module decreases when the spacing in the first battery module and/or in the second battery module between the two compression plates of the respective battery module increases.

The first battery module and the second battery module can have a common compression element which acts on the movably mounted compression plate of the first battery module and on the movably mounted compression plate of the second battery module, so as to cause the compressive force acting on the one or the plurality of battery cells of the first battery module, and the compressive force acting on the one or the plurality of battery cells of the second battery module. In this way, a plurality of battery modules can be provided in a particularly efficient way in a vehicle.

Described according to a further aspect is a method for bracing a battery module which comprises one or a plurality of battery cells. The method comprises: disposing the one or the plurality of battery cells between two compression plates next to one another along the transverse axis of the battery module in such a manner that the spacing between the two compression plates is variable within a spacing range as a result of a variation in the spatial extent of the one or the plurality of battery cells along the transverse axis. The method furthermore comprises: causing a compressive force acting on the one or the plurality of battery cells within the entire spacing range. The compressive force here can be caused by the two compression plates (and by means of one or a plurality of compression elements). In other words, in the context of the method, a compressive force acting on the one or the plurality of battery cells can be caused within the entire spacing range. The compressive force acting on the one or the plurality of battery cells here can be caused by means of the one or the plurality of compression elements by way of the compression plates.

It is to be noted that the methods, devices and systems described in this document can be used individually as well as in combination with other methods, devices and systems described in this document. Furthermore, all of the aspects of the methods, devices and systems described in this document can be combined with one another in many ways. In particular, the features of the claims can be combined with one another in many ways.

DETAILED DESCRIPTION

Figure 1A:
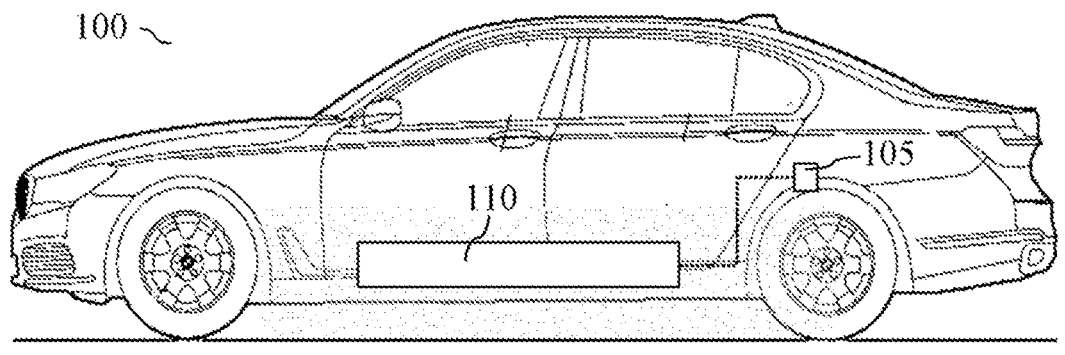
FIG. 1a shows a vehicle with a battery, or with a battery module, for storing electric energy.

As set forth at the outset, the present document is focused on the efficient and precise adjustment of conditions for the mechanical tensions of the battery cells of an electric battery module, in particular of a solid state battery, in different operating states of the battery module. In this context, FIG. 1a shows a vehicle 100 with a battery module 110 for storing electric energy, and an electric drive motor 105 which is operated with electric energy from the battery module 110. A battery module 110 here is typically installed within a battery housing (the latter potentially enclosing a plurality of battery modules 110) in the vehicle 100.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

Figure 1B:
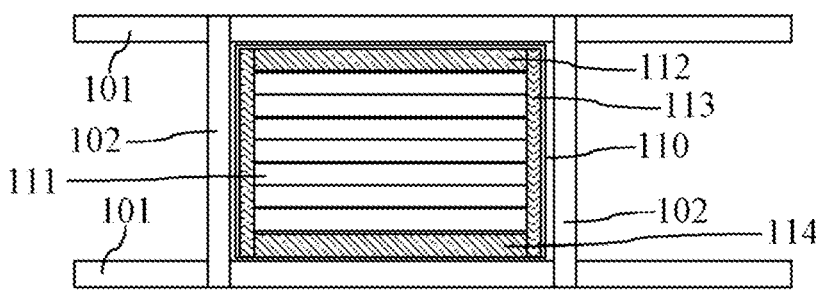
FIG. 1B shows a mounting of a battery module in a vehicle.

FIG. 1B visualizes a mounting of a battery module 110 in a vehicle 100. The vehicle 100 can have (at least or exactly) two longitudinal chassis rails 101 which are aligned along the longitudinal axis of the vehicle 100. Crossmembers 102, which are aligned along the transverse axis of the vehicle 100, can be disposed between the longitudinal chassis rails 101. The battery module 110 can be mounted on one or a plurality of longitudinal chassis rails 101, and/or on one or a plurality of crossmembers 102, of the vehicle 100.

The battery module 110 comprises one or a plurality of battery cells 111, in particular pouch cells. The individual planar battery cells 111 can be disposed in the vehicle 100 in such a manner that the face of a battery cell 111, in particular that the individual layers of a battery cell 111, is/are disposed within a plane defined by the longitudinal axis and by the height axis of the vehicle 100. In this instance, the individual battery cells 111 are disposed next to one another along the transverse axis of the vehicle 100. The thickness of a battery cell 111 thus extends along the transverse axis of the vehicle 100.

The battery module 110 has two compression plates 112, 114, the one or the plurality of battery cells 111 being disposed between the latter. The individual compression plates 112, 114 here are in each case disposed in a plane defined by the longitudinal axis and by the height axis of the vehicle 100. The two compression plates 112, 114 are connected to one another by way of anchors 113, wherein the individual anchors 113 extend along the transverse axis of the vehicle 100. The compression plates 112, 114 can be converged by way of the anchors 113, so as to cause a pressure acting on the one or the plurality of battery cells 111 lying therebetween. For example, a pressure of approx. 10 bar acting on the individual battery cells 111 can be caused by the anchors 113. The pressure acting on the individual battery cells 111 may be required for a reliable operation of the battery cells 111.

The individual battery cells 111 can be configured to expand during a charging procedure and/or to contract during a discharging procedure, as is the case in particular with lithium-ion cells with a solid state electrolyte. The expansion and/or shrinkage in the process can in particular cause a variation in the thickness of the individual battery cells 111 (along the transverse axis of the vehicle 100, or of the battery module 110, respectively). For example, the thickness of the individual battery cells 111 may change by approx. 10% between the discharged state and the charged state.

The variation in the thickness leads to a corresponding variation in the pressure, or the tension, respectively, which is caused to act on or in the individual battery cells 111 by way of the compression plates 112, 114. In particular, the pressure, or the tension, respectively, may increase when charging the battery module 110, while the pressure, or the tension, respectively, decreases when discharging the battery module 110. Consequently, the conditions of the individual battery cells 111 in terms of the mechanical tension vary as a function of the operating state of the battery module 110, which may lead to the performance of the battery module 110 being compromised.

Figure 2:
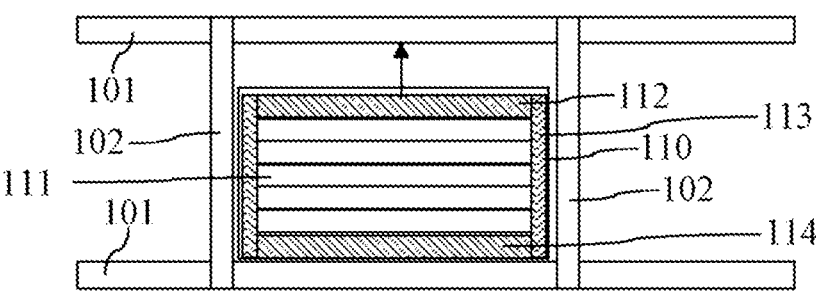
FIG. 2 shows a mounting of a battery module which enables spatial expansion of the battery cells of the battery module.

FIG. 2 shows a mounting of a battery module 110, which mounting makes possible a variation of the volume of the battery module 110 during the operation of the battery module 110. In particular, the mounting illustrated in FIG. 2 enables a variation in the thickness of the individual battery cells 111 of the battery module 110 (along the transverse axis of the vehicle 100, or of the battery module 110, respectively). In the example illustrated in FIG. 2, a second compression plate 114 of the battery module 110 is fixedly connected to a support 101, 102 by way of one or a plurality of fixed bearings. At the other side, the opposite first compression plate 112 of the battery module 110 is movably mounted on a support 102, in particular on a crossmember, by way of one or a plurality of floating bearings, so that the movably mounted first compression plate 112 can move toward the fixedly mounted second compression plate 114 and/or away from the fixedly mounted second compression plate 114 (and thus enables a variation in the thickness of the individual battery cells 111).

The two compression plates 112, 114 can be connected to one another by way of anchors 113 which have a variable length so as to enable a variation in the overall thickness of the battery module 110 (along the transverse axis). In particular, the anchors 113 can be configured to expand in a manner corresponding to the expansion of the battery module 110, and in the process potentially exert a substantially constant pressure on the individual battery cells 111 (the pressure ideally being independent of the expansion of the anchors 113). For this purpose, the individual anchors 113 can have one or a plurality of elastic tensioning elements (or be configured as such).

Figure 3A:
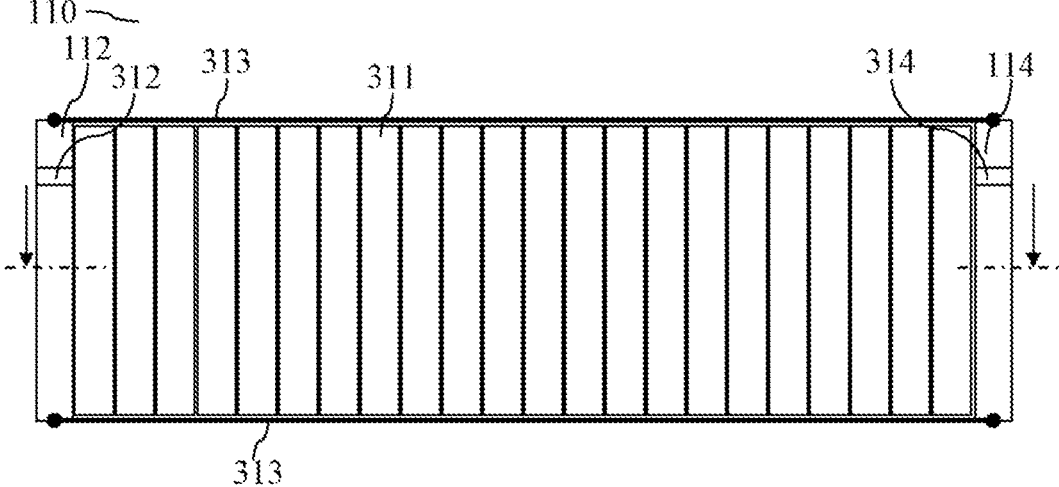
FIGS. 3a to 3c show different views of a battery module with a elastic compression element.
Figure 3B:
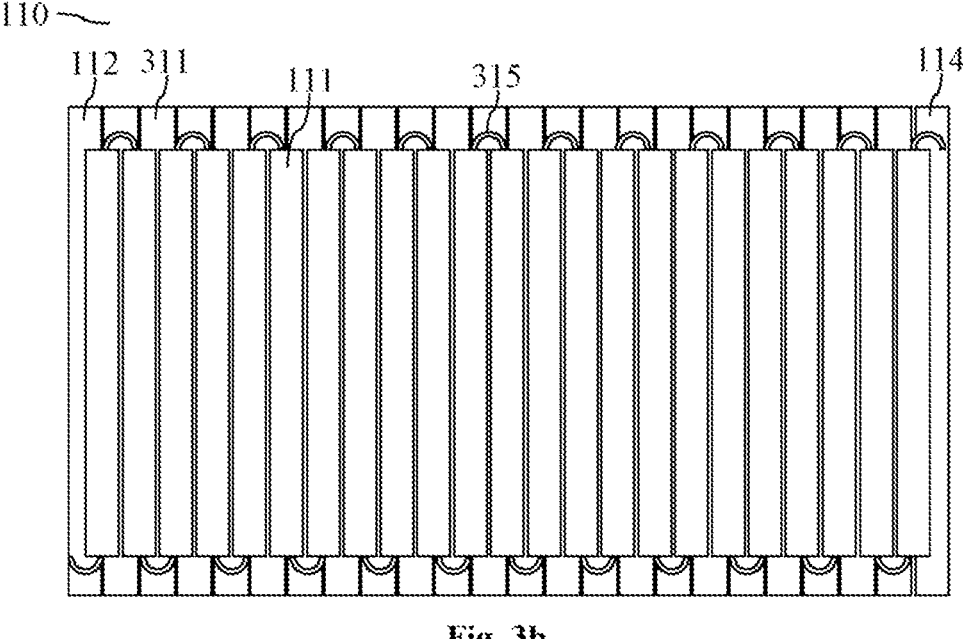
Figure 3C:
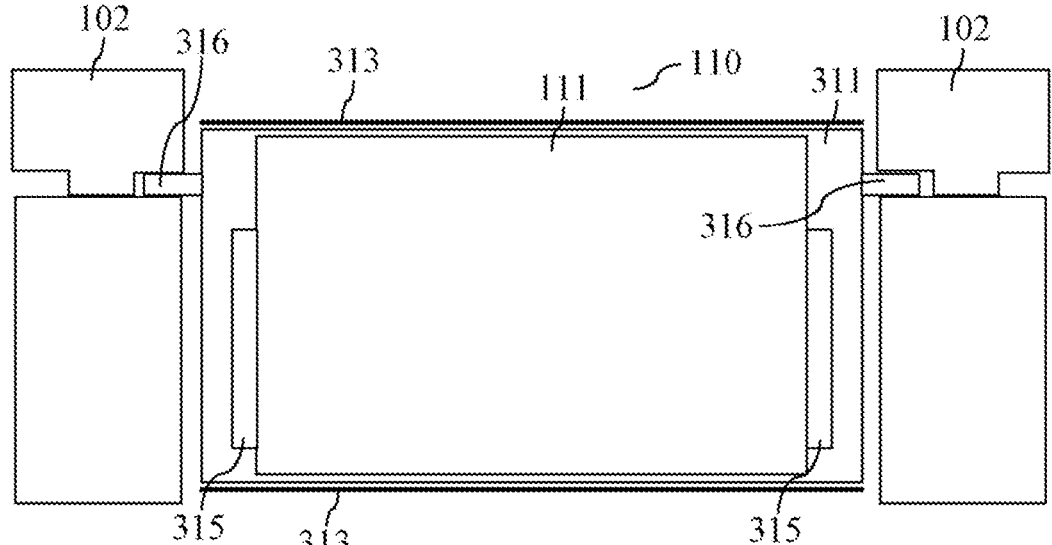

FIGS. 3a to 3c show different views of a battery module 110 in which the two compression plates 112, 114 on two opposite edges are in each case connected to one another by one tensioning element 313, e.g. in each case by way of one elastic (rubber) strap. The tensioning elements 313 are configured to expand or contract, so as to make possible an expansion of the battery cells 111. In the example illustrated in FIGS. 3a to 3c, the individual battery cells 111 are in each case disposed in one cell frame 311, wherein the cell frames 311 can move away from one another during an expansion of the individual battery cells 111, and move toward one another during a shrinkage of the individual battery cells 111. The individual battery cells 111 are connected to one another in an electrically conducting manner by way of cell contacts 315 (e.g. to wire the individual battery cells 111 in series).

FIG. 3*a* shows a lateral view of the battery module 110 (i.e. the height axis corresponds to the vertical axis, and the transverse axis corresponds to the horizontal axis, in FIG. 3*a*). FIG. 3*b* shows the section indicated by the arrows in FIG. 3*a* through the battery module 110. FIG. 3*c* shows a section through the battery module 110 in which the vertical axis corresponds to the height axis, and the horizontal axis corresponds to the longitudinal axis. It is highlighted in FIG. 3*c* how the battery module 110 is movably mounted on crossmembers 102 of the vehicle 100, so as to make possible an expansion and/or contraction of the battery module 110 along the transverse axis.

In this way, planar tensioning elements 313 of a suitable material (e.g. rubber) can be used, which enable a variation in the length or thickness of the cells by 10% at a (potentially approximately) constant force (e.g. 10 bar pressure in terms of the cell face). For example, the tensioning elements 313 can be configured in such a manner that the force caused in a variation in the length or thickness of the cells by 10% deviates from a mean value of force by at most 10% or by at most 20%. The tensioning elements 313 can be connected in a form-fitting and/or force-fitting manner to the compression plates 112, 114 which are disposed on a battery module 110. The variation in the length or thickness of the cells by 10% can be made possible by a fixed bearing/floating bearing arrangement of a battery module 110.

The cells 111 can be mounted in frames 311, wherein the individual frames 311 can be stacked in such a way that they mutually form a guide. One cell 111 can in each case be disposed between two frames 311. The number of frames 311 per module 110 can thus be lower by 1 than the number of cells 111. The two compression plates 112, 114 can in each case form the initial frame and the final frame. An interlayer (e.g. as an adhesive or as a loose interlayer) can optionally be disposed between each of the individual cells 111, which interlayer is configured to absorb shear stresses owing to the relative movements of the cells 111, and/or to enable an ideally uniform distribution of pressure. The shear stresses here can be caused in particular in that the expansion of the individual cells 111 takes place in all spatial directions.

The tensioning elements shown in FIGS. 3*a* to 3*c* can generally be referred to as compression elements 313 which are configured to cause, by way of the compression plates 112, 114, a pressure acting on the one or the plurality of cells 111.

Figure 4A:
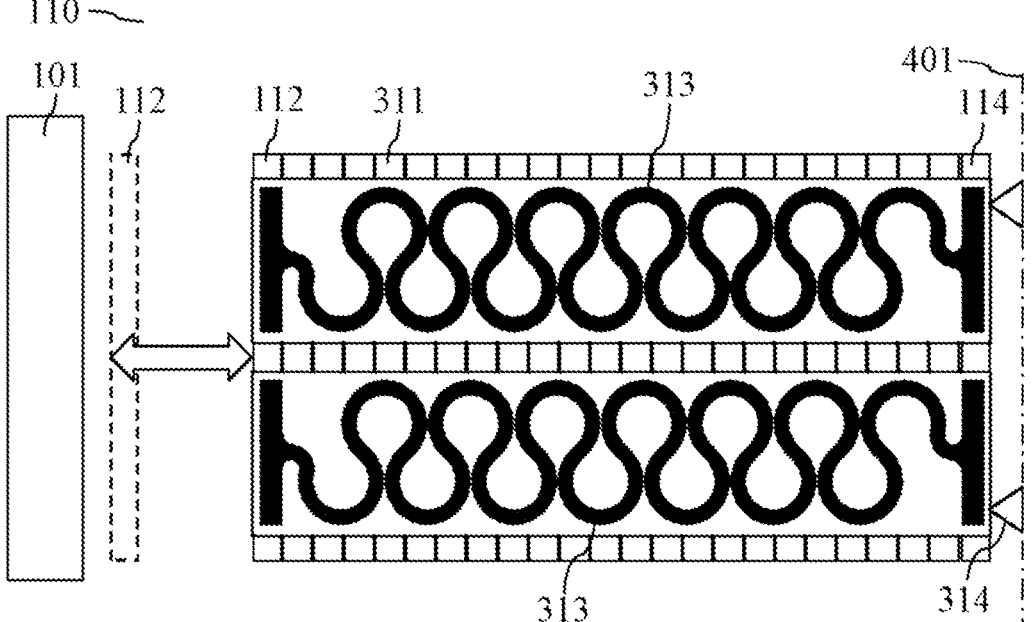
FIGS. 4a to 4e show elastic compression elements of different configurations.

FIGS. 4*a* to 4*e* visualize different design examples of compression elements 313 which make possible an expansion of the battery 110 at an (at least approximately) consistent pressure acting on the battery module 110, or on the individual battery cells 111, respectively. FIG. 4*a* shows the use of one or a plurality of serpentine springs as tensioning elements 313. A serpentine spring here can already have a specific pre-load (e.g. 50% elongation) in the non-expanded state of the battery module 110, so as to cause a force acting on the battery cells 111.

Figure 4B:
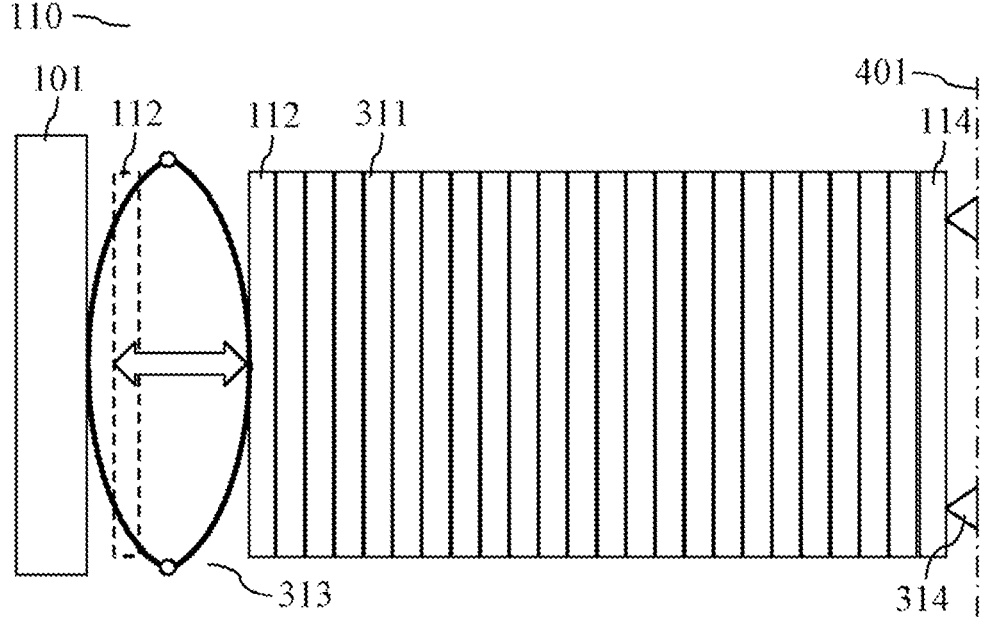

FIG. 4*b* shows the use of a leaf spring as the compression element 313 for causing a tension within the battery cells 111. The leaf spring can be disposed, for example, between a (longitudinal) support 101 and the floating first compression plate 112 of the battery module 110, so as to exert a pressure on the floating first compression plate 112. The leaf spring is thus supported on the support 101 on one side, and on the first compression plate 112 on the other side. In the example illustrated in FIG. 4*b*, a fixed bearing 314 for mounting the battery module 110, in particular for mounting the second compression plate 114, can be disposed in the vehicle center 401. The battery assembly illustrated in FIG. 4*b* can be disposed in a mirror-symmetrical way in the other half of the vehicle 100. A disk spring can be used alternatively or additionally to a leaf spring.

Figure 4C:
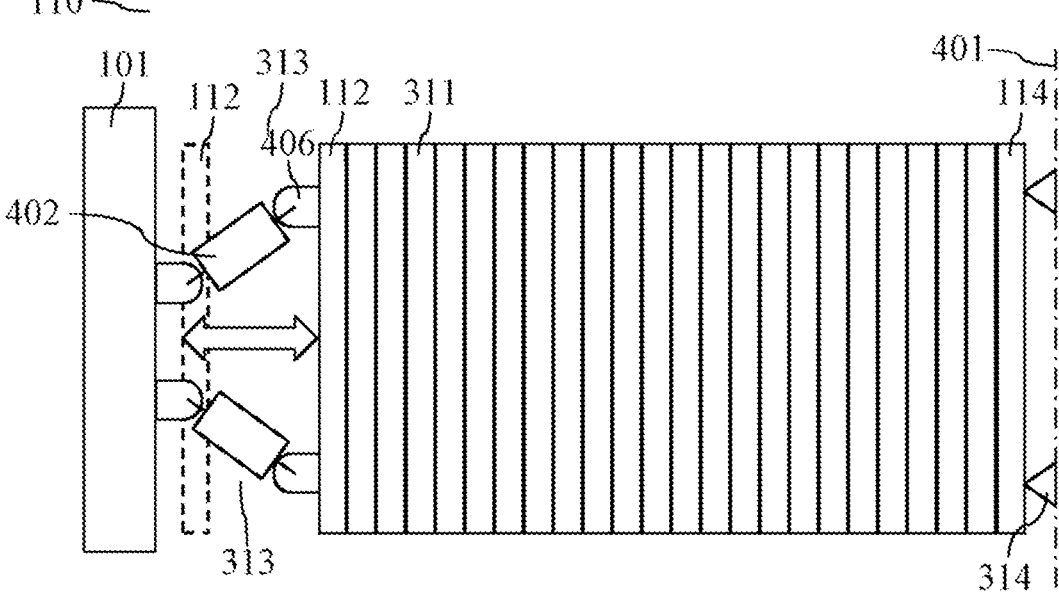

FIG. 4*c* shows the use of compression springs 402 (as the compression element 313) which are disposed between a (longitudinal) support 101 and the floating first compression plate 112 so as to exert a pressure on the first compression plate 112. As is illustrated in FIG. 4*c*, the compression springs 402 can be disposed in pairs obliquely in relation to the transverse axis, so that the force vector changes during the expansion of the battery module 110 and potentially enables a degressive force profile (the compression springs 402 tilt sideways during the expansion of the battery module 111 so that the force component of the compression springs 402 in the direction toward the expansion of the battery module 110 decreases). In this way, the profile of the force acting on the first compression plate 112 can be adjusted by the angle of the compression springs 402.

Figure 4D:
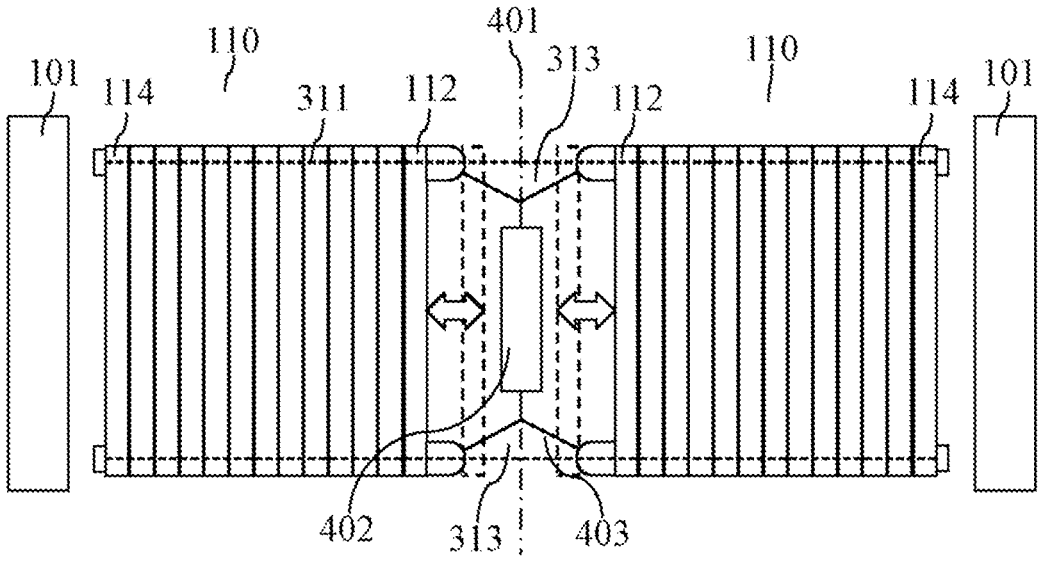

FIG. 4*d* visualizes a disposal of battery modules 110 on both sides in terms of the vehicle center 401. In the battery modules 110 shown in FIG. 4*d*, the expansion of the battery modules 110 takes place toward the vehicle center 401. The floating first compression plates 112 of the two battery modules 110 thus face the vehicle center 401. A (common) compression spring 402 is disposed between the two battery modules 110, which compression spring 402 is configured to exert, in each case by way of toggle levers 403, a force on the floating first compression plates 112 of both battery modules 110. The force vector in the direction of the expansion of the battery modules 110 can be varied as a function of the degree of expansion by way of the toggle levers 403, in particular in order to provide a degressive force profile as the degree of expansion increases.

Figure 4E:
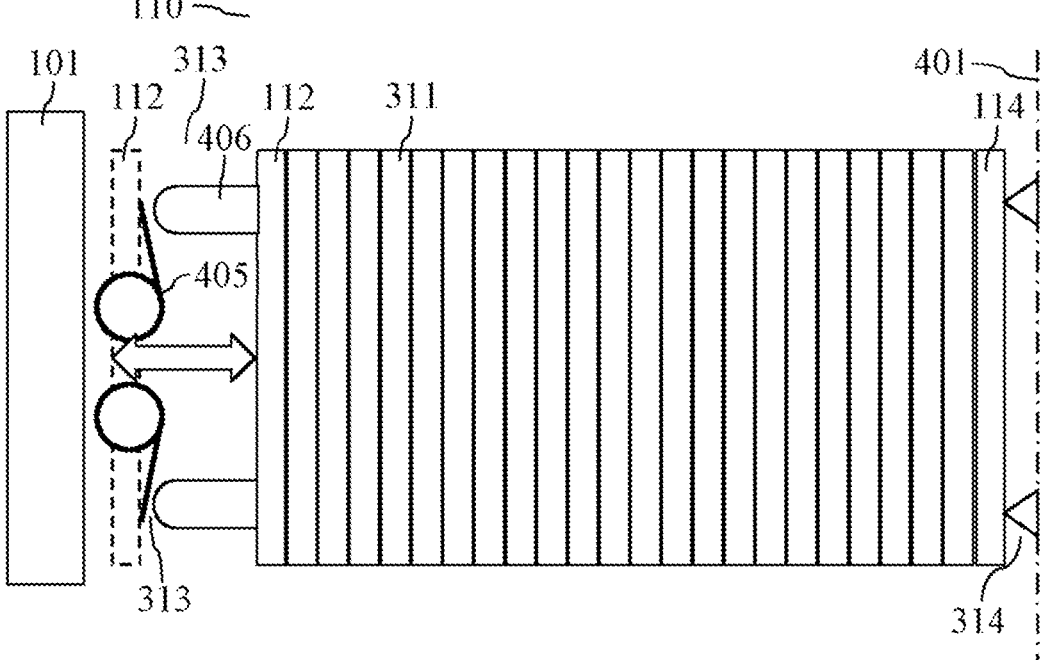

FIG. 4*e* shows an example in which leg springs 405 (as the compression element 313) are used to make possible an expansion of the battery module 110, and in the process exert a force on the floating first compression plate 112. FIG. 4*e* by way of example shows the position of the first compression plate 112 in the expanded state of the battery module 110 (compression plate 112 illustrated with dashed lines). The leg of a leg spring 405 can be supported on a cam 406 of the compression plate 112 that is fixed to the latter. A degressive force profile as the degree of expansion of the battery module 110 increases can be caused by way of the lever length of the one or the plurality of leg springs 405, the lever length changing during the expansion of the battery module 110.

Figure 5:
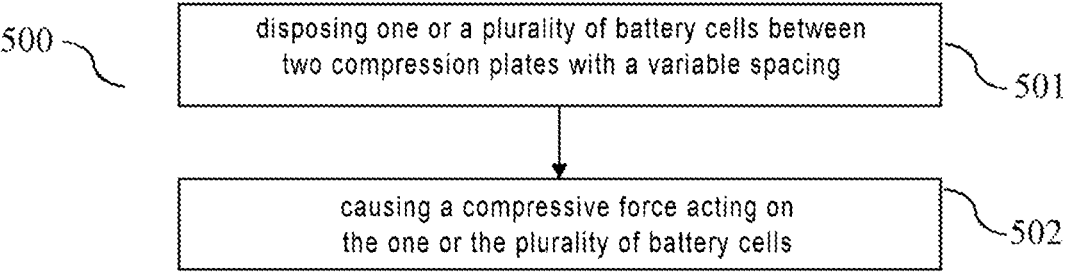
FIG. 5 shows a flow chart of a method for bracing a battery module.

FIG. 5 shows a flow chart of a method 500 for bracing a battery module 110, wherein the battery module 110 comprises one or a plurality of (for example 10 or more, or 50 or more) battery cells 111.

The method 500 comprises: disposing 501 the one or the plurality of battery cells 111 between two compression plates 112, 114 next to one another along the transverse axis of the battery module 110 in such a manner that the spacing between the two compression plates 112, 114 is variable within a spacing range as a result of a variation in the spatial extent of the one or the plurality of battery cells 111 along the transverse axis. The extent of the one or the plurality of battery cells 111 can be increased by an expansion of the one or the plurality of battery cells 111 (during a charging procedure) and/or be decreased by a contraction of the one or the plurality of battery cells 111 (during a discharging procedure). The spacing range can extend between the minimum extent (in the discharged state) and the maximum extent (in the charged state) of the one or the plurality of battery cells 111.

The method 500 furthermore comprises: causing 502 by, or by way of, the two compression plates 112, 114 a compressive force acting on the one or the plurality of battery cells 111 within the entire spacing range. In this way, a (potentially substantially consistent) pressure acting on the one or the plurality of battery cells 11 can be caused across the entire spacing range.

As a result of the measures described in this document, an expansion of a battery module 110 at adjustable conditions in terms of pressure or tension of the individual battery cells 111 can be made possible. The performance of the battery module 110 can be increased in this way.

The present subject matter is not limited to the examples shown. It is to be noted in particular that the description and the figures are intended to visualize the principle of the proposed methods, devices and systems by way of example only.

The invention claimed is:

1. A battery module for storing electric energy, comprising:

one or more battery cells disposed between two compression plates so as to be next to one another along a transverse axis of the battery module, wherein the battery module is configured such that:

a spacing between the two compression plates is variable within a spacing range so that a variation in a spatial extent of the one or more battery cells exists along the transverse axis; and the two compression plates apply a compressive force to the one or more battery cells within the entire spacing range, the one or more battery cells in a discharged state has a minimum overall extent along the transverse axis, the one or more battery cells in a charged state have a maximum overall extent along the transverse axis, the maximum overall extent is in particular between 5% and 15% above the minimum overall extent, and the spacing range toward a bottom is delimited by the minimum overall extent, and toward a top is delimited by the maximum overall extent.

2. The battery module according to claim 1, wherein the battery module is further configured such that the compressive force acting on the one or more battery cells within the entire spacing range varies by at most 20%.

3. The battery module according to claim 1, wherein the battery module is further configured such that the compression plates acting on the one or more battery cells:

apply, within the entire spacing range, a minimum pressure of 8 bar on the one or more battery cells that is not undershot; or apply, within the entire spacing range, a maximum pressure of 12 bar on the one or more battery cells that is not exceeded.

4. The battery module according to claim 1, further comprising:

a compression element configured to push and/or pull the first compression plate of the two compression plates toward the second compression plate of the two compression plates.

5. The battery module according to claim 4, wherein the compression element comprises a rubber tensioning strap or a serpentine spring configured to pull the first compression plate toward the second compression plate.

6. The battery module according to claim 5, wherein the compression element is configured such that the force applied by the spring on the first compression plate is varied as a function of the spacing between the two compression plates as a result of a disposition of the spring which is oblique in relation to the transverse axis.

7. The battery module according to claim 4, wherein the compression element comprises a leaf spring, a compression spring, a leg spring or a disk spring configured to push the first compression plate toward the second compression plate.

8. The battery module according to claim 4, wherein the compression element has a leg spring with one leg which acts on a cam that is connected to the first compression plate.

9. The battery module according to claim 4, wherein the compression element comprises a compression spring that acts on the first compression plate by way of a toggle lever.

10. The battery module according to claim 1, wherein the battery module is configured such that the first compression plate of the two compression plates is movably mounted, and the second compression plate of the two compression plates is immovably mounted.

11. The battery module according to claim 1, further comprising:

a frame configured to surround battery cells that are disposed directly next to one another, wherein the frame is mounted so as to be movable along the transverse axis.

12. A vehicle, comprising:

at least one support; and at least one battery module according to claim 1, which is mounted on the support.

13. The vehicle according to claim 12, further comprising:

a first battery module; and a second battery module, wherein the first battery module and the second battery module are disposed in the vehicle such that a spacing between the movably mounted compression plate of the first battery module and a movably mounted compression plate of the second battery module decreases when the spacing between the two compression plates of the first battery module or the spacing between the two compression plates of the second battery module increases.

14. The vehicle according to claim 13, wherein the first battery module and the second battery module have a common compression element that acts on the movably mounted compression plate of the first battery module and on the movably mounted compression plate of the second battery module so as to cause the compressive force acting on the one or more battery cells of the first battery module and the compressive force acting on the one or more battery cells of the second battery module.

15. A method for bracing a battery module comprising one or more battery cells, the method comprising:

disposing the one or more battery cells between two compression plates so as to be next to one another along a transverse axis of the battery module;

configuring the battery module such that a spacing between the two compression plates is variable within a spacing range so that a variation in a spatial extent of the one or more battery cells exists along the transverse axis;

applying, by the two compression plates, a compressive force to the one or more battery cells within the entire spacing range;

establishing that the one or more battery cells in a discharged state have a minimum overall extent along the transverse axis;

establishing that the one or more battery cells in a charged state have a maximum overall extent along the transverse axis;

setting the maximum overall extent to be between 5 percent and 15 percent above the minimum overall extent; and delimiting the spacing range toward a bottom by the minimum overall extent and toward a top by the maximum overall extent.

16. A battery module for storing electric energy, comprising:

one or more battery cells disposed between two compression plates so as to be next to one another along a transverse axis of the battery module, wherein the battery module is configured such that:

a spacing between the two compression plates is variable within a spacing range so that a variation in a spatial extent of the one or more battery cells exists along the transverse axis, the two compression plates apply a compressive force to the one or more battery cells within the entire spacing range; and a compression element configured to push and/or pull the first compression plate of the two compression plates toward the second compression plate of the two compression plates, wherein the compression element comprises a rubber tensioning strap or a serpentine spring configured to pull the first compression plate toward the second compression plate.

\* \* \* \* \*